Oct. 24, 1933.  N. SKILLMAN ET AL  1,931,998
COMBINED END THRUST AND SELF ALIGNING SUPPORTING BEARING
Filed Dec. 4, 1930
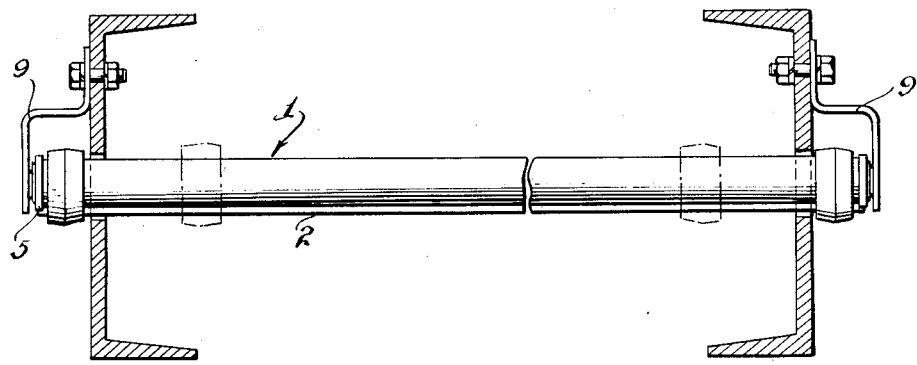
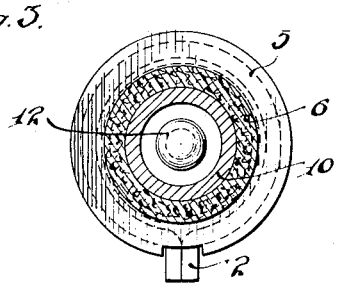
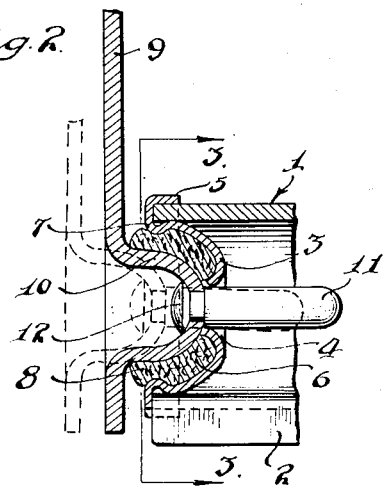
INVENTORS.
*NEWTON SKILLMAN*
BY *JOSEPH P. LAVIGNE*
ATTORNEYS.

Patented Oct. 24, 1933

1,931,998

UNITED STATES PATENT OFFICE 1,931,998

COMBINED END THRUST AND SELF-ALIGNING SUPPORTING BEARING

Newton Skillman and Joseph P. Lavigne, Detroit, Mich., assignors to O. & S. Bearing Company, Detroit, Mich., a corporation of Michigan Application December 4, 1930. Serial No. 500,006

9 Claims. (Cl. 308—163)

This invention relates to a combined end thrust and self-aligning supporting bearing, and has to do particularly with a combined bearing and shaft structure of the end thrust self-aligning type.

In application Serial No. 278,179, filed May 16, 1928, a self-aligning bearing is disclosed, one part of which is formed by a hemi-spherical stud mounted on the end of a shaft, and the other part of which is a similarly shaped bearing supported by a bracket and serving both as an end thrust bearing and supporting bearing for the shaft. It is the object of the present invention to provide an improved bearing of the same general type but which is more efficient and dependable in service and less expensive to manufacture.

More specifically, the present invention contemplates a self-aligning supporting bearing having a hemi-spherical bearing housing directly mounted on the end of the shaft, a substantially spherical shaped inner bearing member stamped out from the supporting bracket and a layer of lubricant impregnated fibrous material impressed between said two bearing parts. In order to insure absolute alignment of the bearing parts carried by the shaft and the bracket at all times, means is provided for positively insuring return of the bearing parts to their proper relative position when the chassis frame is flexed or distorted. Other features of construction and assembly will be brought out in the specification and claims.

In the drawing:

Fig. 1 is a transverse sectional view taken through a chassis frame having a cross brake shaft and bearing support embodying the present invention.

Fig. 2 is an enlarged fragmentary sectional view illustrating a detailed construction and assembly of the bearing unit.

Fig. 3 is a sectional view taken on line 3—3 of Fig. 2.

The present invention is, of course, particularly applicable to a cross brake shaft or a similar oscillating shaft having bearings in each end and such shaft forms an indispensable part of the combination. In the embodiment shown in the drawing the cross brake shaft may be generally designated 1.

This cross brake shaft is preferably hollow and in the drawing is shown as being formed of sheet metal terminating in a flange or key 2. The end of the hollow cross shaft acts as a support for one part of the universal bearing and, as best shown in Fig. 2, this part of the bearing consists of a stamped sheet metal bearing housing 3.

This outer bearing member 3 is substantially hemi-spherical in shape and provided with a cupped aperture 4 at its center and an annular rearwardly extending flange 5 at its periphery. A lining 6 of lubricant impregnated fibrous material is permanently positioned within the outer bearing member 3. This bushing 6 may be stamped in place at the time of forming the sheet metal bearing member or may be spun, pressed, or otherwise formed into shape after the forming of the bearing unit. An annular inwardly extending bulge 7 is preferably formed in the bearing member 3, as best shown in Fig. 2, whereby to assist in holding the preformed fibrous bushing 6 in place.

The bearing member 3 is of very inexpensive construction, and it will be obvious that this bearing member with its permanently positioned bushing may be readily snapped into place at the ends of the shaft. The bearing surface of the bushing 5 preferably has a portion 8 extending past the normal center of the spherical portion of the bushing and this extension 8 not only assists in supporting the shaft but positively prevents any metal contact between the metal parts and the bearing member.

The other part of our self-aligning bearing also consists of a stamping and preferably is made up of a combined bracket and bearing portion. In this preferred form, as best illustrated in Fig. 2, the bracket 9 is struck out or embossed as at 10 to form an inner spherically shaped bearing member adapted to cooperate with the bushing 6. This bracket 9 may fit on the inside of the chassis frame or may be positioned on the outside as illustrated in Fig. 1. The main point here is not the positioning of the bracket but the fact that the bracket and inner spherical bearing member are formed as one integral stamping. This stamping out of the bracket adds very little to the bracket cost and at the same time materially strengthens the unit and obviously materially decreases time of assembly.

Self-alignment of each bearing unit at each end of the shaft is thus made possible through a relatively great angle and more than sufficient to take care of any posible mis-alignment of a cross brake shaft or the like. Even if the cylindrical portion at the base of the inner spherical member 10, and the extension 8, should be relatively great this will not hinder relative alignment as the cylindrical portion can be very easily compressed and thus allow the spherical portion 10 to seat within the main portion of the bushing 6.

Obviously there will be some spreading of the supporting frame members of the chassis when the vehicle is subjected to unequal strains and in order to prevent the cross brake shaft from dropping out at such a time we have provided a small pin 11 adapted to be secured as at 12 to the spherical inner bearing 10 as by upsetting or otherwise. This pin protrudes through the apertures 4 of the outer bearing member 3 and in case the brackets 9 at the opposite end of the shaft should be spread apart for any reason it will be obvious that the pin 11 will cause positive centering of the hemi-spherical bearing portions 3 and 10 when the brackets 9 assume their normal relative position. The relative relationship of the bearing parts in normal and spread position is shown by full and dotted lines in Fig. 2. This pin 11 may be of very inexpensive material and obviously it is very easily secured to the inner bearing 10 so as to present a very small item of cost in the fabrication of the bearing unit.

It will thus be obvious that we have provided self-aligning self-lubricating bearing units in combination with a connecting oscillating shaft wherein the bearing is formed essentially of only two parts, one part being carried by the end of the shaft and the other part formed as a part of the bracket. The direct result is the complete elimination of many parts of the ordinary self-aligning bearing unit. Our bearing units in combination with a shaft not only form end thrust bearings but at the same time support the shaft in self-aligning relation. The side frames may be temporarily spread without in any way destroying the effectivenes of the bearing support.

It will be understood that the outer bearing member 3 or the part which is carried by the shaft may take various forms without changing the scope of the present invention, the essential feature being that the outer portion of the bearing, including the preformed bushing, is carried by the end of the shaft.

What I claim is:

1. A combined end thrust and supporting bearing for cross brake shafts and the like, comprising an inwardly extending spherically shaped bearing member, a preformed spherically shaped, self-lubricating bushing member supported by the cross shaft, and a pin carried by one of said members and protruding through the other to preserve substantial alignment of the bearing and bushing.

2. A combined end thrust and supporting bearing of the type adapted to serve as the sole means for supporting a cross brake shaft and the like, comprising an inwardly extending spherically shaped bearing unit directly supported by a side frame, a complemental bearing member directly supported by the end of the cross shaft and having a bearing surface of self-lubricating material for directly receiving and supporting the inwardly extending bearing unit, and means on one of said bearing units and adapted to extend through the other for maintaining the same in substantial axial alignment in case of temporary separation.

3. A combined end thrust and self-aligning supporting bearing comprising as one element a bracket having a struck out inwardly extending spherical portion formed integrally therewith and a second element positioned on the end of the shaft and having an inwardly extending spherically shaped bearing portion complementally shaped to receive the inwardly extending portion of the bracket, and means for maintaining substantially axial alignment of said two bearing parts irrespective of any temporary separation thereof.

4. A combined end thrust and self-aligning supporting bearing for cross brake shafts and the like, consisting mainly of two units, one being directly supported by the end of the cross shaft and having a spherically shaped bearing surface extending inwardly of the cross shaft, and the other unit consisting of a spherically shaped portion directly supported by a bracket and extending inwardly within the end of the cross shaft and contacting with the first named surface, and means secured to one unit and extending through the other for supporting said units in axial relationship in case of any spread of the brackets at the opposite end of the shaft.

5. A combined end thrust and self-aligning supporting bearing for cross brake shafts and the like adapted to be supported by side frames, comprising a bracket having a spherically shaped bearing portion stamped therefrom, an outer stamped bearing member secured directly to the end of the cross shaft, and lubricant impregnated material carried by said bearing member for receiving the stamped portion of the bracket.

6. A combined end thrust and self-aligning supporting bearing for cross brake shafts and the like adapted to be supported by side frames, comprising a bracket having a spherically shaped bearing portion stamped therefrom, an outer stamped bearing member secured directly to the end of the cross shaft, lubricant impregnated material carried by said bearing unit for receiving the struck out portion of the bracket, and a pin carried by said struck out portion and passing through said outer bearing member for maintaining said bearing parts in substantial axial alignment.

7. A combined end thrust and self-aligning supporting member for cross brake shafts and the like, comprising a bracket having a spherically shaped bearing portion stamped therefrom, a spherically shaped outer bearing member secured to the end of the cross shaft and having a bushing of preformed lubricant impregnated material substantially encircling said stamped out bearing portion, an aperture in said outer bearing member and a pin secured to said stamped out portion and passing through said aperture.

8. A combined end thrust and self-aligning supporting bearing for cross brake shafts and the like, consisting solely of two units, one being directly supported by the end of the cross brake shaft and having a spherically shaped bearing surface extending inwardly of the cross shaft, and the other unit consisting of a spherically shaped portion directly supported by a bracket and extending inwardly with the end of the cross shaft and contacting with the first named surface, said second unit having an extending portion passing through the first unit to maintain said two units in alignment.

9. A combined end thrust and self-aligning supporting bearing for cross brake shafts and the like, consisting mainly of two units, one being directly supported by the end of the cross shaft and having a spherically shaped bearing surface extending inwardly of the cross shaft, and the other unit consisting of a spherically shaped portion directly supported by a bracket and extending inwardly within the end of the cross shaft and contacting with the first named surface, and means secured to one unit and extending through the other for supporting said units in axial relationship in case of any spread of the brackets at the opposite end of the shaft, the portion of the first named unit for receiving said last named means being arcuately shaped in cross section to permit angular movement between the two units.

NEWTON SKILLMAN.
JOSEPH P. LAVIGNE.